United States Patent [19]

Litherland et al.

[11] Patent Number: 4,489,237

[45] Date of Patent: Dec. 18, 1984

[54] METHOD OF BROAD BAND MASS SPECTROMETRY AND APPARATUS THEREFOR

[75] Inventors: Albert E. Litherland, Toronto; Linas R. Kilius; Emil L. Hallin, both of Downsview, all of Canada

[73] Assignee: The Innovations Foundation of the University of Toronto, Toronto, Canada

[21] Appl. No.: 348,103

[22] Filed: Feb. 11, 1982

[51] Int. Cl.[3] .................... B01D 59/44; H01J 49/40

[52] U.S. Cl. .................... 250/287; 250/282; 250/294

[58] Field of Search .................... 250/287, 281, 282, 283, 250/294, 396 R

[56] References Cited

U.S. PATENT DOCUMENTS

| | | | |
|---|---|---|---|
| 3,863,068 | 1/1975 | Poschenrieder | 250/287 |
| 4,005,291 | 1/1977 | Arsenault | 250/282 |
| 4,037,100 | 7/1977 | Purser | 250/281 |

FOREIGN PATENT DOCUMENTS

| | | | |
|---|---|---|---|
| 780999 | 8/1957 | United Kingdom | 250/287 |
| 193775 | 5/1967 | U.S.S.R. | 250/294 |

*Primary Examiner*—Janice A. Howell
*Assistant Examiner*—Constantine Hannaher
*Attorney, Agent, or Firm*—Hirons, Rogers & Scott

[57] ABSTRACT

A highly sensitive broad band mass spectrometer consists of a broad band selector of a low energy level beam of negative ions to be examined; a molecular disintegrator and charge changer which receives the negative ions and produces a beam of high-energy multiply charged positive ions free of molecules; and a broad band high-energy, continuously-operable isochronous time-of-flight mass spectrometer which receives the output from the molecular disintegrator. The disintegrator destroys molecules that would obscure the measurement of atomic species. Both selector and spectrometer preferably are electrostatic to avoid mass discrimination and maintain the broad band capability. The use of an isochronous time-of-flight mass spectrometer permits continuous operation which increases sensitivity. The ion selector may be of a magnetic type if a somewhat narrower band of masses is acceptable.

12 Claims, 3 Drawing Figures

METHOD OF BROAD BAND MASS SPECTROMETRY AND APPARATUS THEREFOR

FIELD OF THE INVENTION

The present invention is concerned with improvements in or relating to methods of mass spectrometry and also in or relating to apparatus therefor. More particularly the invention is concerned with methods and apparatus for sensitive, broad band mass spectrometry, whereby a relatively wide range of ionic masses can be examined simultaneously to a high degree of sensitivity.

REVIEW OF THE PRIOR ART

There is a continuing need for methods and apparatus for ultra-sensitive examination and analysis of materials, i.e. so as to be able to detect impurities of less than one part per billion ($10^{-9}$) to examine samples of micron size. As a specific example of the application of apparatus of this sensitivity, it can be used for the examination of the silicon or gallium arsenide used for the manufacture of solid state devices, since if this includes radioactive impurities of this order of magnitude there is the possibility of the internal generation of spurious "bits" by discharge of a particle, causing operation errors in the apparatus in which it is incorporated.

Another field of application is the dating of materials by carbon 14 or chlorine 36 measurements. The established techniques depend upon the sensing and counting of particles emitted by the radioactive isotope to determine its relative abundance in the sample, or by the sequential measurement of isotopic abundance directly by sensitive mass analysis. The determination could be conducted very much more quickly with greater accuracy and with much smaller samples of material by the simultaneous measurement of isotopes.

Severe problems also arise in the examination for mass analysis of extremely small samples, since the act of examining the sample by an ion "micro-probe" can change significantly the constitution of the sample. Unless therefore a simultaneous "one-step" determination can be made of all of the components from a single scan by the probe it may not be possible to repeat the examination at all, or at least without significant error. Many analysts also require the examination of extremely small areas of a large sample, i.e. of the order of a square micron, in order to analyse a small inclusion therein. Scanning of this order is feasible but the subsequent analysis requires a high order of sensitivity and simultaneous maximum isotopic information if useful results are to be obtained.

It is well recognized in the art that broad band capability is highly desirable in a mass spectrometer, but this has been difficult to achieve, since the magnetic systems employed are inherently narrow band mass-selective, making the design of a broad-band system able to measure accurately in a greater range of masses complex and expensive.

There has been described in U.S. Pat. No. 4,037,100, issued July 19, 1977 to General Ionex Corporation an ultra-sensitive spectrometer for making mass and elemental analyses. The apparatus requires a source of negative ions produced as a beam thereof which is mass analysed by passing it through a mass analysis magnet. The selected portion of the mass analysed beam is then passed to a molecular dissociator, such as a tandem accelerator, in which molecules in the beam are dissociated by coulomb disruption and the ions undergo charge exchange to issue therefrom as a high energy beam of positively charged ions. The beam is then magnetically deflected and directed into an energy sensitive detector calibrated to provide an output signal proportional to the energy of the detected particles. Such apparatus is essentially narrow band in operation.

The magnetic devices that are required for the rigid high momentum high-energy beams are complex and expensive if ions of high mass are to be measured effectively, and the selectivity falls off rapidly with increasing mass. The use of multiple detectors spatially distributed from one another and each detecting a different range of masses results in even greater complexity and expense.

DEFINITION OF THE INVENTION

There is therefore a need for an analysis facility which can determine:

(a) Isotopic and elemental abundances of any element in very small (picogram to milligram) quantities of material.

(b) the spatial variations of a broad band of isotopic and elemental abundances on the surfaces of material with point to point resolutions as low as 1 micron, and simultaneous determination of all relevant mass at each point.

(c) Isotopic and elemental concentration levels in ranges lower than the currently accepted limits, namely in levels less than 1 part in $10^9$.

It is the principal object of the invention to provide a new mass spectrometer of such broad band capability and high sensitivity, even with ionic masses in the upper range of the elemental values.

In acordance with the invention there is provided a method of high-energy, broad-band, charge-changing mass spectrometry:

(a) producing a continuous quantity of negatively charged atomic ions of mass band and abundance to be determined, which quantity will also include unwanted molecular ions, (b) passing the said continuous quantity of negative ions through at least one electrostatic device which is charge sensitive in accordance with the ratio E/q where E is the ion energy and q is the ion charge, whereby the device will select ions of wanted ratio and reject ions and molecules of unwanted ratio, so that the device receives the said quantity of negative ions and selects therefrom the ions of wanted ratio and rejects the ions of unwanted ratio, (c) passing the selected ions from the electrostatic device of (b) to an accelerating, molecular destruction and charge-changing device in which the selected ions are accelerated to result in higher energy ions of energy sufficient to permit the passage of these higher energy ions through the accelerating and charge-changing device with molecular destruction and change of charge to result in a beam of multiply-charged positive ions including molecular fragments, and (d) passing the said beam of multiply-charged positive ions and molecular fragments to a continuous operation electrostatic time-of-flight mass analysis system that is isochronous for ions of the same mass, the system comprising a start detector and a cooperating stop detector through which the received beam passes for operation of the system, (e) the start detector comprising a thin foil through which the received beam passes resulting in an output beam therefrom of ions of altered charge state and consequent changed E/q ratios, (f) the mass analysis system comprising at least one system electrostatic device which is charge sensitive in accordance with the said ratio E/q for selection of positive ions of wanted ratio and rejection of ions of unwanted ratio, the device receiving the beam passing through the system, selecting the positive ions of wanted ratio and rejecting the ions of unwanted ratio.

In another method of the invention the ion source produces positive ions and the positive ions are passed through a charge changing device to produce a corresponding quantity of negative ions that are then passed to the accelerating and charge changing device.

The invention also embraces apparatus for carrying out the methods of the invention.

DESCRIPTION OF THE DRAWINGS

Methods and apparatus that are particular preferred embodiments of the invention will now be described, by way of example, with reference to the accompanying schematic drawings wherein.

DESCRIPTION OF THE PREFERRED EMBODIMENTS

Figure 1:
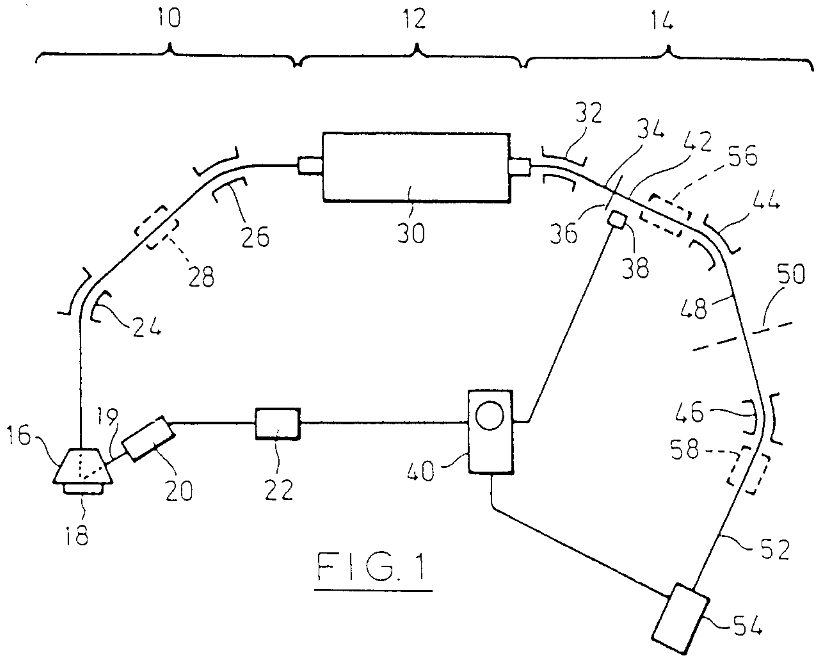
FIG. 1 illustrates a first embodiment incorporating an all-electrostatic means for selecting the range of ionic masses to be examined.

The apparatus conveniently is considered as divided into three major successive portions, namely a first portion 10 in which the ions to be examined are prepared in the form of a low energy beam and subjected in a selector to a preliminary broad-band analysis, a second or middle portion 12 in which the prepared beam of ions is subjected to molecular disintegration and charge exchange to result in a high energy beam of positive ions, and a third or final portion 14 comprising an isochronous electrostatic mass spectrometer in which the final sensitive analysis is carried out.

In this first embodiment the first portion 10 comprises a source 16 of negative ions, the particular source producing negative secondary ions as the result of scanning a sample 18 with a beam 19 of positive ions produced by a source 20 thereof under the control of a scanning circuit 22 which rasters the beam over the sample. For example the positive ion source can be a liquid metal hydrodynamic source in which the ions are produced by high gradient electric fields, or a gas discharge source such as a Penning ion source, or a thermal ionisation source employing cesium or gallium. Such sources are available in which the scanning beam has a cross-sectional area of about 1 micron square or less. The impingement and scanning of such a beam generates a shower predominantly of secondary negatively-charged ions that constitutes a simultaneous assay of all the atoms in the scanned area and can therefore include ions of a wide range of masses. Inevitably it will also include molecular ions of the same charge and stray molecular and atomic ions of opposite charge, the unwanted ions and molecules constituting an unwanted interfering background. At the usual energies employed in mass spectrographs of a few tens of kilovolts such molecules persist even after they have passed through regions of high gas pressure.

Scanning beams of this kind can be produced with a low energy spread to give beam current of about one microampere, and can be focussed to less than 1 micron diameter because of the low energy spread which corresponds to chromatic aberration. The secondary ion beam must be injected into the molecular disintegrator and charge changer of the middle section without substantial mass discrimination if the objective is to be achieved, and to this end the ion selector system is a broad band electrostatic mass spectrometer comprising two spaced spherical electrostatic analyser lenses 24 and 26. Such lenses are mass insensitive, but instead are charge sensitive in accordance with the relation E/q where E is the ion energy and q is the ion charge.

The first deflecting lens 24 ensures as far as possible that the ions originate at the ion source and that they have suffered no molecular break-up or charge changing collisions, while the second lens focusses the ions on the input to the molecular disintegrator so as to inject the negative ion beams therein at the relatively small target presented by its charge changing canal; this lens will also assist in eliminating from the beam any unwanted doubly-charged ions and/or ions of wrong energy.

In some analyses it is preferred to be able to examine the sample with a negative primary ion probe, which will result in a shower of positive secondary ions (plus the corresponding contaminants). It is more efficient to produce some negative ions by the charge changing of positive ions than by direct sputtering, and this is especially true for the group III elements such as Al and the group II elements such as Be which form more abundant metastable negative ions. Since the production of negative ions by charge changing is a multistep process, the yield of metastable ions can also be expected to be higher than by direct sputtering. This option is readily provided by including a charge-changing device 28 between the two lenses 24 and 26 at their mutual stigmatic focus. This is also an appropriate location for an intensity reducing device, such as a chopper, to prevent overloading of the subsequent portions of the apparatus. There may also be provided at this location a suitable slit to select the ion energy with greater resolution. An example of such a negative ion probe is an intense beam of oxygen or halogen ions. The charge-changer is for example a canal containing a metal vapour, typically sodium, maintained at about (20+W) KV inside the canal where −W is the voltage (negative) of the canal. Collisions in the canal will result in some molecular dissociations and the resulting fragments will be rejected by lens 26, so that a "cleaner" beam results. The lens 26 focuses the ion beam to a "point" which forms the object for the entrance lens of the molecular disintegrator 30.

The function of the device 30 is to accelerate the negative ions to a relatively high potential, e.g. about 3 MV, and then pass them through a gas-containing charge-changing canal from which they emerge as energetic positive ions. Under these conditions sufficient outer electrons are stripped from any molecules present in the beam to ensure their disintegration as described below. The operation of such a disintegrator or dissociator is also described in the above-mentioned U.S.

Pat. No. 4,037,100, the disclosure of which is incorporated herein by reference.

One of the most serious problems of conventional mass spectrometry is the limitation of sensitivity in elemental analysis by the interference of molecular ions of almost the same mass. An efficient way to eliminate the molecular interference is to use the fact that removing three or more electrons from the molecules causes them to break up rapidly. This complete molecular destruction is achieved by accelerating the negative ions in a tandem accelerator to about 1-3 MeV at the tandem terminal where they are stripped of a few electrons by colliding with argon gas atoms in a charge changing canal. The terminal voltage of about +1 to +3MV is chosen to maximize the yield of charge state +3 for light atoms, since it is known in the art that at least three electrons must be removed to ensure the destruction of molecules. Other charge states (Q) will also be produced in these equilibrium charge changing collisions. The positive ions emerging from the positive terminal will be further accelerated by the electric field from the terminal voltage down to ground potential. For charge state $Q=+3$ and terminal voltage +3MV the energy of the ions is about 12 MeV and one of the advantages of using these energetic ions is that nuclear particle detectors can be used to detect and identify them. The normal range of energies of these particles is about 8–20-MeV and for massive particles (i.e. $M>100$) of these energies magnetic lenses would be complex and expensive.

The beam of positive ions emerging from the charge changer 30 passes through a further electrostatic analyser lens 32 which will reduce the quantity of the molecular fragments produced therein, so that they are not passed to the mass spectrometer portion 14. For useful experimental results the beam of ions must be analysed as to mass (M), energy (E), and charge (q). As is known and described above the electrostatic analyser lenses used so far are only able to discriminate as to ratios of E/q, and in most cases it is preferred that there be no discrimination on the basis of mass. The mass determination is therefore effected in the final portion of the apparatus using a time of flight mass spectrometer that is isochronous as to the time of flight for ions of the same mass and with the energy spread accepted by the apparatus (usually ±0.5%). In a typical system up to about 1 million ions per minute are emitted by the disintegrator 30, giving an average time interval between successive particles of 60 microseconds. The transit time through the isochronous spectrometer will be of the order of 200 nano-seconds per meter of flight path, which is therefore sufficiently smaller than the above-mentioned time interval for the apparatus to be operated continuously without the need for pulsed operation, and with minimum dead time, to obtain the necessary mass discrimination. Such continuous operation is preferred with apparatus of the invention. A more compact and optimum configuration can be achieved by use of pairs of electrostatic analyser triplet lenses of alternating electrostatic gradient sector type, with corresponding shorter drift spaces between each pair. For a general discussion of electrostatic lenses and their design reference may be made to "Focusing of charged particles" edited by Albert Septier and published 1967 by the Academic Press Inc. New York, N.Y.

The stream of high energy ionised particles issuing from the disintegrator 30 pass through a first drift space 34 to a start detector constituted by the combination of a thin carbon film 36 and a secondary electron detector 38. Thus, the passage of a particle through the film causes ejection of secondary electrons that are transferred to the detector 38 by a weak electron lens, the resultant electric signal being fed to a suitable measuring/recording device, such as a cathode ray oscilloscope 40, or time-to-amplitude converter. The particle beam continues through a second drift space 42 and enters the first one of a pair of symmetric spherical electrostatic analysers 44 and 46, the analyser 44 being disposed with the start detector at its object plane. In this embodiment the analysers are designed to deflect the path of the particle beam through 43.42° and they are spaced apart a specific distance described below to provide an intervening drift space 48. These analysers produce deviations of the particle beam of equal amounts in the same sense and with a common focal plane 50 in the space 48, so that the system is symmetrical about the plane 50. The particle stream emerging from the second analyser 46 passes through a final drift space 52 and enters a total energy absorber and stop detector 54 disposed at the object plane of the analyser 46 and producing an electric signal that is also fed to the measuring device 40, this signal therefore being representative of the energy of the received ion as well as giving its arrival time for transit time determination.

The passage of the highly energetic positive ions through the carbon film 36 is unavoidably accompanied by energy straggling, small energy scattering and charge changing collisions producing an energy spread and a small angular divergence between the particles of the beam. This energy spread and divergence reduces the accuracy of measurement in a time-of-flight detector when used for unit mass resolution to the extent that resolution is difficult for atomic masses below 100 and impossible for masses above 100. For example it can be shown that the percentage energy difference ($\Delta E/E$) between $^{194}Pt^{+5}$ the ion produced from PtH is about 0.08%, whereas the energy spread through a carbon film of 2 $\mu g/cm^2$ thickness is 80 KeV for ion accelerating potentials of 18 MeV, corresponding to a $\Delta E/E$ of about 0.44%. Attempts to increase the resolution of the apparatus by increasing the length of the flight path and consequently the intrinsic time of flight resolution is ineffective, since the said percentage energy difference is so heavily swamped by the energy spread through the film. Moreover, in practice as described below it is preferred to decrease the size of the equipment as much as possible and not increase it. A further cause of error is that some of the "rays" constituting the particle beam impinging on the film are inclined "off-axis".

Other small energy variations are introduced into the particle beam by, for example:

(1) Variation in ion accelerating potential, (2) Multiple charge exchange and acceleration, (3) Breakup of molecules, in particular of hydrides.

These other variations are either compensated for by the apparatus to be described or the unwanted particles are rejected from the beam.

The effects of the energy variations produced by the start signal fail are compensated by arranging for the flight path through the apparatus to be isochronous for particles of the same mass. This is possible if the ion flight path is proportional to the square root of the energy spread according to the relation $$L = L_0\sqrt{1 + \Delta E/E} \quad (1)$$

where $L_o$ is the length of the trajectory for the primary ion, i.e. the ion of original velocity before the effect of the spread. The more energetic ions will follow longer paths, while the less energetic will follow shorter paths, the transport time along any of the trajectories depending only on the ion mass. The time of flight and hence the mass resolution will be limited due to this finite energy spread introduced by the thin carbon foil and typically a mass resolution of 0.5% can be expected for a foil thickness of 2 $\mu g/cm^2$. The effect of this finite energy spread can be removed by an appropriate choice of the electric analyzers 44 and 46 (or their equivalent) and the connecting drift spaces so that the ion trajectories from start to stop detector are essentially made isochronous for ions of the same mass. Although a number of configurations are possible, for transport to be isochronous, those consisting of two electric analyzers with radial focusing are constrained by the condition:

$$\frac{L}{r} = \frac{\cos(p\theta) \pm 1}{p\sin(p\theta)} \quad (2)$$

where L is the drift space length, r is the radius of curvature, $\theta$ is the bending angle and p is the field index for the electrostatic analyzer. A practical configuration is given by:

L-1.88 meters
$\theta$=43.24°
r=0.75 meter
p=1.

The configurations of lens elements described permits the isochronous transport of all ions from the object plane of the first lens element to the image plane of the second lens element. With the system symmetric about the stigmatic focus plane 50 the isochronous transport is able to compensate for the angular divergence of the ions that is also introduced by the foil 36 to the first order. Lenses of other deviation will require other factors as will be apparent to those skilled in the art.

Although in one preferred embodiment spherical electrostatic analysers producing a deviation of 43.42° are employed, such devices of sufficient size for a beam of satisfactory energy and envelope dimensions tend to be large and costly, the drift spaces on either side of each analyser being of the order of 1.88 meters for analysers of 0.75 meter radii of curvature. In a less expensive construction also illustrated by FIG. 1 the spherical analysers 44 and 46 are replaced by two cylindrical analysers providing approximately the same angle of deviation and two focusing elements 56 and 58 such as electrostatic quadrupoles are disposed respectively in the drift spaces 42 and 52.

Figure 2:
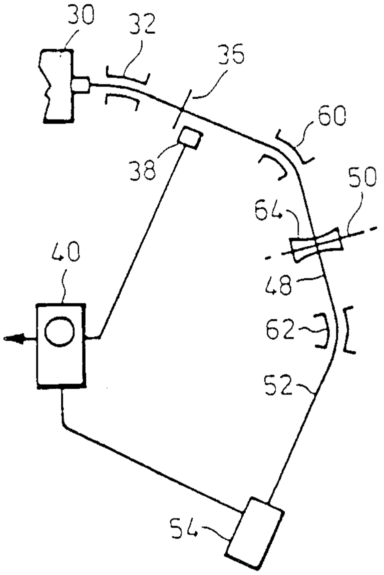
FIG. 2 illustrates a second embodiment comprising a different configuration of time-of-flight mass spectrometer from that of FIG. 1, the portion of the apparatus preceding the time-of-flight spectrometer being the same.

In another embodiment illustrated by FIG. 2, the spherical electrostatic analysers of FIG. 1 are replaced by two symmetric cylindrical lenses 60 and 62 with an interposed singlet defocusing quadrupole lens 64 in the drift space 48 at the stigmatic focus plane 50. In this second embodiment the deviation produced by the elements 60 and 62 is approximately 45°.

In a fourth embodiment illustrated in part by FIG. 1 the spherical electrostatic analysers of part 14 are replaced by a triplet of electrostatic analysers such that the first and last elements of the triplet have equal electric field gradients and bending angle, but gradients of opposite sign to that of the central member of the triplet. The magnitudes of gradients and the bending angles of the triplet elements are chosen to reduce the length of the drift spaces between each triplet. This length reduction is possible for electric gradients of greater than 2, for which the time compensation of this analyser segment requires the same sign as that for a drift space with a corresponding stronger time compensation.

The underlying principle is that the transit time for an ion which has lost or gained energy can be adjusted to be equal for all ions of the same mass, if an appropriately shorter or longer trajectory is chosen. In general the flight path length through a sector field increases in response to an increase in ion energy. As the opposite is true for drift spaces, a suitable combination of sector fields and drift spaces can always be found to produce isochronous trajectories.

The count rate of the apparatus described is limited essentially by the maximum time of transit between start and stop detectors for the mass band under consideration. This is because one has to make sure that during the time of flight of an ion no other ion will enter the detectors to give a false start or stop signal. For masses equal to or less than 232 atomic mass units (amu), E=15 MeV and flight path of 3 meters the maximum time of flight should be about 1 microsecond, implying a maximum count rate for the isochronator of about 100 kHz (allowing for a 10% efficiency of charge state transmission from the start timing foil to the stop detector). Because of the limitation of the count rate it will be preferred to restrict the width of the mass band under analysis, and in particular to eliminate the copious amount of light ions which usually are not of interest. One way to accomplish this is by appropriate selection of the charge state using lens 24 and 26 or their equivalents. For instance, the choice of Q greater than +11 for 15 MeV ions can be made to effectively eliminate almost all the light ions, since they will not have the correct E/q values to pass through the Isochronator.

With the above-described start detector using secondary electrons emitted by the passage of an ion through a thin foil, the secondary electrons can at present be detected at best with approximately 100 picoseconds resolution. The stop detector 54 can be similar to the start detector or, for example, a surface barrier or gas ionisation detector which can give good timing (about 100–400 picoseconds) and energy signals. It is clear that with care one can get an overall timing resolution of better than $\Delta t$=400 picoseconds. The mass spectrum of the examining beam is obtained with the usual timing amplifiers, constant fraction discriminators and time-to-amplitude converters.

For a conventional time-of-flight the mass (M) is related to the non relativistic energy (E), flight time (t) and flight path (1) as follows:

$$M = 2Et^2/1^2 \quad (3)$$

wherein two successive isochronous path particle receiving means 14 are provided and wherein the inclinations of the two means are opposite and equal with the object plane of one coincident with the image plane of the other. Such an arrangement is also isochronous in space, that is to say "off-axis" rays of the particle beam are also rendered isochronous.

Figure 3:
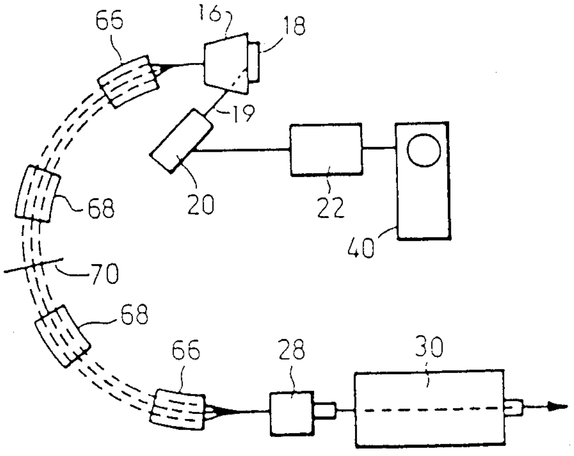
FIG. 3 shows an alternative magnetic form of negative ion selector if maximum broad band operation is not required.

In many applications of the invention the maximum broad band capability of the first described embodiment may not be necessary, for example when a somewhat restricted range of masses is to be examined, and in this case the embodiment of FIG. 3 may be employed, wherein at least the ion producer is of magnetic type and not electrostatic. The system comprises two pairs of magnetic lenses 66 and 68 replacing the electrostatic devices 24 and 26 of FIG. 1 and symmetrically disposed about a plane 70 in which the ions of different masses are dispersed because of the mass sensitivity of the lenses. The system need only be of relatively low overall resolution (approx. 10%), since the final resolution is accomplished in the ion receiving portion comprising the line-of-flight mass spectrometer. Any mass discrimination required is readily provided at the plane 70 by means of a suitably shaped aperture, and this system does provide the facility of eliminating substantially completely ions of any unwanted ranges of mass, such as those of the lighter elements and also the heavier unwanted molecules and molecular fragments which may not be entirely eliminated in the system of FIG. 1. This system therefore has the advantage of producing a "cleaner" beam of ions. It also permits the use of higher ion currents in the selected mass range and results in higher sensitivity. A charge change canal device 28 is provided if required.

Low detection limits (greater than one part in $10^{12}$) and high sensitivity (efficiencies of greater than 1%) are the principal requirements for the detection and measurement of most radioisotopes at natural abundances or the search for rare particles of unknown mass. In the search for these particles using prior art broad band mass spectrometry at least one or more ion beams formed by the abundant stable isotope must be selectively removed or attenuated by at least 9 to 12 orders of magnitude to prevent damage to the heavy ion detectors due to an excessive counting rate. The medium band magnetic systems of this invention which accept a band of masses ($\Delta M = 0.1$ M) would therefore be appropriate for these searches as specific masses within that band can be attenuated or removed. On the other hand, as described above the typical ion microprobe examination requires low sample consumption (modification) rates, which dictates the use of low current primary scanning beams, and hence low secondary ion intensities can be anticipated, and the mass independent all electric systems of the invention are more suitable in this case.

We claim:

1. A high energy broad band charge changing mass spectrometer comprising:

(a) means for producing a continuous quantity of negatively charged atomic ions of mass band and abundance to be determined, which quantity will also include unwanted molecular ions, (b) at least one electrostatic device which is charge sensitive in accordance with the ratio E/q where E is the ion energy and q is the ion charge, whereby the device will select ions of wanted ratio and reject ions and molecules of unwanted ratio, the device receiving the said quantity of negative ions and unwanted molecules from the ion producing means, selecting from the said quantity the ions of wanted ratio and rejecting ions and molecules of unwanted ratio, (c) an accelerating, molecular destruction and charge changing device receiving the selected ions and remaining unwanted ions and molecules from the said electrostatic device, accelerating the received ions and molecules to result in higher energy ions of energy sufficient to permit the passage of these higher energy ions through the accelerating and charge changing device with molecular destruction and change of charge to result in a beam of multiply charged positive ions including molecular fragments, and (d) a continuous-operation electrostatic time-of-flight mass analysis system that is isochronous for ions of the same mass, the system comprising a start detector and a cooperating stop detector through which the received beam passes for operation of the system, (e) the start detector comprising a thin foil through which the received beam passes resulting in an output beam therefrom of ions of altered charge state and consequent changed E/q ratios, (f) the mass analysis system comprising at least one system electrostatic device which is charge sensitive in accordance with the said ratio E/q for selection of positive ions of wanted ratio and rejection of ions of unwanted ratio, the device receiving the beam passing through the system, selecting the positive ions of wanted ratio and rejecting the ions of unwanted ratio.

2. A broad-band mass spectrometer as claimed in claim 1, including an additional electrostatic device between the said accelerating and charge-changing device and the time-of-flight mass analysis system, receiving the said beam of multiply charged positive ions from the charge-changing device and delivering the resultant output beam to the analysis system, the added electrostatic device being charge sensitive in accordance with the said ratio E/q for selection of positive ions of wanted ratio and rejection of ions of unwanted ratio and selecting from the output of the acceleration and charge-changing device ions of wanted ratio and rejecting ions and molecular fragments of unwanted ratio.

3. A broad-band mass spectrometer as claimed in claim 1, wherein two electrostatic devices charge sensitive in accordance ith the ratio E/q are provided between the negative ion producing means and the accelerating and charge changing device, the two devices being focussing devices having a common stigmatic focus, one device being the electrostatic device of (b) and having the negative ion producing means at a respective focus, and the other device having the inlet to the acceleration and charge changing device at a respective focus.

4. A high energy, broad band, charge changing mass spectrometer comprising:

(a) means for producing a continuous quantity of positively charged atomic ions of mass band and abundance to be determined, which quantity will also include unwanted molecular ions, (b) at least one electrostatic device which is charge sensitive in accordance with the ratio E/q wherein E is the ion energy and q is the ion charge, whereby the device will select ions of wanted ratio and reject ions of unwanted ratio, the device receiving the said continuous quantity of positive atomic ions and unwanted molecules from the ion producing means, selecting from the said quantity the ions of wanted ratio and rejecting ions and molecules of unwanted ratio, (c) a charge changing device receiving the selected ions and remaining unwanted ions and molecules from the last-mentioned electrostatic device and producing a corresponding quantity of negative ions, (d) an accelerating, molecular destruction and charge-changing device receiving the negative ions from the charge changing device, accelerating the received ions to result in higher energy ions of energy sufficient to permit the passage of these higher energy ions through the accelerating and charge changing device with molecular destruction and change of charge to result in a beam of multiply charged positive ions including molecular fragments, and (e) a continuous-operation electrostatic time-of-flight mass analysis system that is isochronous for ions of the same mass, the system comprising a start detector and a cooperating stop detector through which the received beam passes for operation of the system, (f) the start detector comprising a thin foil through which the received beam passes resulting in an output beam therefrom of ions of altered charge state and consequent changed E/q ratios, (g) the mass analysis system comprising at least one system electrostatic device which is charge sensitive in accordance with the said ratio E/q for selection of positive ions of wanted ratio and rejection of ions of unwanted ratio, the device receiving the beam passing through the system, selecting the positive ions of wanted ratio and rejecting the ions of unwanted ratio

5. A broad-band mass spectrometer as claimed in claim 4, including an additional electrostatic device between the said accelerating and charge-changing device and the time-of-flight mass analysis system, receiving the said beam of multiply charged positive ions from the charge-changing device and delivering the resultant output beam to the analysis system, the added electrostatic device being charge sensitive in accordance with the said ratio E/q for selection of positive ions of wanted ratio and rejection of ions of unwanted ratio and selecting from the output of the acceleration and charge-changing device ions of wanted ratio and rejecting ions and molecular fragments of unwanted ratio.

6. A broad-band mass spectrometer as claimed in claim 4, and including a further electrostatic device disposed between the first-mentioned charge changing device and the said accelerating and charge-changing device, the said further electrostatic device being charge sensitive in accordance with the said ratio E/q and selecting from the said quantity of negative ions the ions of wanted ratio and rejecting ions of unwanted ratio.

7. A method of high energy, broad-band, charge-changing mass spectrometry comprising:

(a) producing a continuous quantity of negatively charged atomic ions of mass band and abundance to be determined, which quantity will also include unwanted molecular ions, (b) passing the said continuous quantity of negative ions through at least one electrostatic device which is charge sensitive in accordance with the ratio E/q where E is the ion energy and q is the ion charge, whereby the device will select ions of wanted ratio and reject ions and molecules of unwanted ratio, so that the device receives the said quantity of negative ions and selects therefrom the ions of wanted ratio and rejects the ions of unwanted ratio, (c) passing the selected ions from the electrostatic device of (b) to an accelerating, molecular destruction and charge-changing device in which the selected ions are accelerated to result in higher energy ions of energy sufficient to permit the passage of these higher energy ions through the accelerating and charge changing device with molecular destruction and change of charge to result in a beam of multiply charged positive ions including molecular fragments, and (d) passing the said beam of multiply charged positive ions and molecular fragments to a continuous-operation electrostatic time-of-flight mass analysis system that is isochronous for ions of the same mass, the system comprising a start detector and a cooperating stop detector through which the received beam passes for operation of the system, (e) the start detector comprising a thin foil through which the received beam passes resulting in an output beam therefrom of ions of altered charge state and consequent changed E/q ratios, (f) the mass analysis system comprising at least one system electrostatic device which is charge sensitive in accordance with the said ratio E/q for selection of positive ions of wanted ratio and rejection of ions of unwanted ratio, the device receiving the beam passing through the system, selecting the positive ions of wanted ratio and rejecting the ions of unwanted ratio.

8. A method as claimed in claim 7, including passing the said beam of multiply charged positive ions and molecular fragments from the accelerating and charge-changing device through an additional electrostatic device before the beam is passed to the time-of-flight mass analysis system, the added electrostatic device being charge sensitive in accordance with the said ratio E/q for selection of positive ions of wanted ratio and rejection of ions of unwanted ratio and selecting from the output of the acceleration and charge-changing device ions of wanted ratio and rejecting ions and molecular fragments of unwanted ratio.

9. A method as claimed in claim 7, including passing the quantity of ions from the negative ion source through two electrostatic devices which are charge sensitive in accordance with the ratio E/q, the two devices being focussing devices having a common stigmatic focus, one device being the electrostatic device of (b) and having the negative ion producing means at a respective focus, and the other device having the inlet to the acceleration and charge changing device at a respective focus.

10. A method of high-energy, broad-band, charge-changing mass spectrometry comprising:

(a) producing a continuous quantity of positively charged atomic ions of mass band and abundance to be determined, which quantity will also include unwanted molecular ions, (b) passing the said continuous quantity of ions through at least one electrostatic device which is charge sensitive in accordance with the ratio E/q where E is the ion energy and q is the ion charge, whereby the device will select ions of wanted ratio and reject ions of unwanted ratio, so that the device receives the said quantity of ions and selects therefrom the ions of wanted ratio and rejects the ions of unwanted ratio, (c) passing the selected ions from the last-mentioned electrostatic device through a charge-changing device so as to produce a corresponding quantity of negative ions, (d) passing the negative ions from the last-mentioned charge-changing device to an accelerating, molecular destruction and charge-changing device in which the ions are accelerated to result in higher energy ions of energy sufficient to permit the passage of these higher energy ions through the accelerating and charge changing device with molecular destruction and change of charge to result in a beam of multiply charged positive ions including molecular fragments, and (e) passing the said beam of multiply charged positive ions and molecular fragments to a continuous-operation electrostatic time-of-flight mass analysis system that is isochronous for ions of the same mass, the system comprising a start detector and a cooperating stop detector through which the received beam passes for operation of the system, (f) the start detector comprising a thin foil through which the received beam passes resulting in an output beam therefrom of ions of altered charge state and consequent changed E/q ratios, (g) the mass analysis system comprising at least one system electrostatic device which is charge sensitive in accordance with the said ratio E/q for selection of positive ions of wanted ratio and rejection of ions of unwanted ratio, the device receiving the beam passing through the system, selecting the positive ions of wanted ratio and rejecting the ions of unwanted ratio.

11. A method as claimed in claim 10, including passing the said beam of multiply charged positive ions and molecular fragments from the accelerating and charge-changing device through an additional electrostatic device before the beam is passed to the time-of-flight mass analysis system, the added electrostatic device being charge sensitive in accordance with the said ratio E/q for selection of positive ions of wanted ratio and rejection of ions of unwanted ratio and selecting from the output of the acceleration and charge-changing device ions of wanted ratio and rejecting ions and molecular fragments of unwanted ratio.

12. A method as claimed in claim 10, including passing the quantity of ions from the charge-changing device of (c) through another electrostatic device which is charge sensitive in accordance with the ratio E/q, the two electrostatic devices between the negative ion producing means and the accelerating and charge changing device being focussing devices having a common stigmatic focus, one device being the electrostatic device of (b) and having the ion producing means at a respective focus, and the other device having the inlet to the acceleration and charge changing device at a respective focus.

* * * * *